May 15, 1928. 1,669,443
E. J. BILLSTROM
CLAMP ATTACHMENT
Filed Jan. 5, 1927
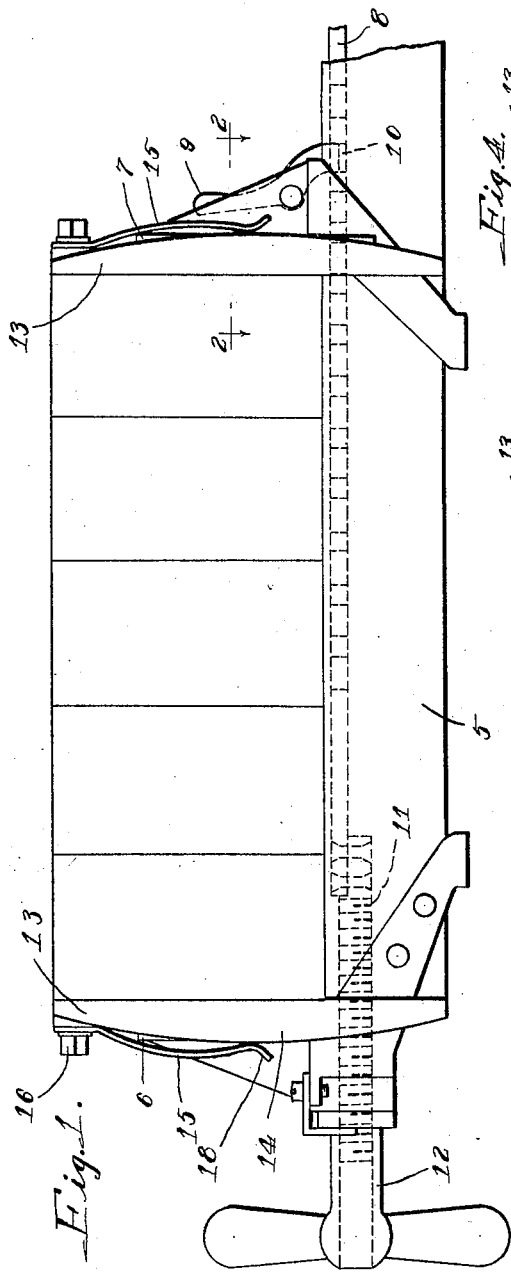
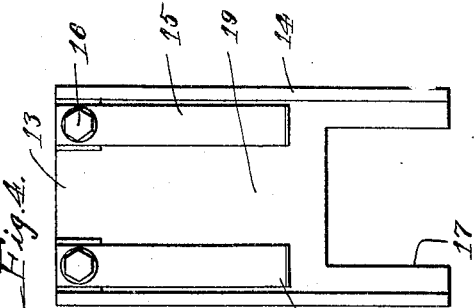
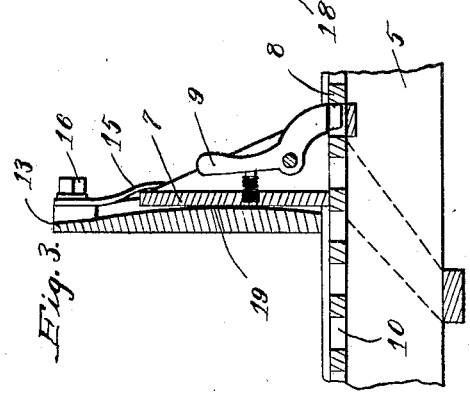
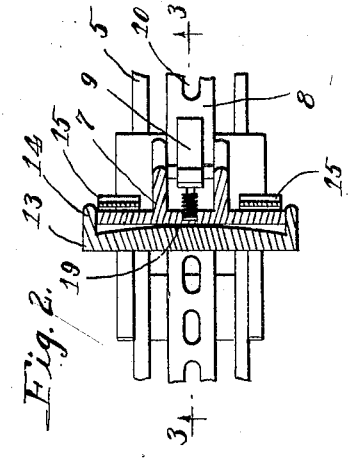
Inventor
Edwin J. Billstrom
By Wilson & McCanna
Attys.

Patented May 15, 1928.

1,669,443

UNITED STATES PATENT OFFICE.

EDWIN J. BILLSTROM, OF ROCKFORD, ILLINOIS.

CLAMP ATTACHMENT.

Application filed January 5, 1927. Serial No. 159,087.

This invention relates to a novel attachment for clamps, such as are used in woodworking for the holding of work after the gluing thereof, and has for its principal object the provision of attachments in the nature of auxiliary jaws to increase the range of sizes of work which can be accommodated by the clamp and insure uniform clamping pressure irrespective of the size or shape of the work.

According to the present invention auxiliary jaws are provided for application to the ordinary jaws of a clamp, such as are used for bench or machine work, and may be set at different heights depending on the size of the work to be handled so as to locate the center line of pressure between the jaws approximately midway of the height of the work and thereby secure practically uniform distribution of pressure and correspondingly improve the grade of work produced. The auxiliary jaws are, furthermore, conformed on their rear faces to rock on the main jaws so as to be tiltable and accommodate the clamp to the particular shape of the work being handled and permit even pressure on the work. In the present embodiment of my invention the holding means for the auxiliary jaws comprises yieldable leaf springs clipping over the main jaws and bearing against the rear faces thereof, the rocking of the auxiliary jaws being permitted by the yielding of the leaf springs when the auxiliary jaws are caused to be tilted by the work.

The invention is more fully described in the following specification in which reference is made to the accompanying drawing wherein—

Figure 1 is a side view of a standard type of bar clamp having the jaws thereof equipped with the novel attachments of my invention;

Fig. 2 is a horizontal section taken on the line 2—2 of Fig. 1 and illustrating both the manner of application of the auxiliary jaws to the main jaws and the capacity of the auxiliary jaws for rocking sidewise;

Fig. 3 is a vertical section taken on the line 3—3 of Fig. 2 and serving to show the capacity of the auxiliary jaws for rocking vertically; and Fig. 4 is a rear face view of one of the auxiliary jaws removed from the clamp.
The same reference numerals are applied to corresponding parts throughout the views.

Any suitable or preferred type of bar clamp would serve to show the manner of application of the present invention. The bar clamp shown in Fig. 1 is of a standard well known type and so far as the present invention is concerned may be used for bench work or on a glue clamp carrier machine. It comprises a bar 5 having a fixed jaw 6 and a movable jaw 7 mounted thereon, the latter being operated by a slotted rod 8 in relation to which it is adjustable endwise of the bar 5 by engaging the spring pressed latch 9 selectively in any one of the spaced slots 10. The rod 8 is operated in the usual manner by the screw 11 and handled nut 12 so as to clamp work between the jaws 6 and 7 after the gluing thereof. It has been found that a clamp of this kind has a rather limited range of usefulness inasmuch as certain sizes of work will overreach the jaws to such an extent that it is impossible to secure uniform distribution of pressure. Furthermore, the work to be handled had to be of a perfectly uniform shape inasmuch as the jaws were rigid and incapable of adapting themselves to the irregularities of the work. It is, therefore, the principal object of my invention to provide attachments for the clamping jaws in the nature of auxiliary jaws to surmount the main jaws and be adjustable above the height thereof and correspondingly increase the capacity of the clamp as respects the height of the work that may be handled, the object being to adjust the auxiliary jaws vertically depending on the height of the work so as to have the center line of pressure between the clamping jaws approximately midway of the height of the work and thereby insure uniform distribution of pressure. It is a still further object of the invention to provide auxiliary jaws attachable in the manner referred to and capable of rocking in any direction on the main jaws so as to accommodate themselves to the irregularities of the work.

The auxiliary jaws are shown at 13, and inasmuch as they are substantially identical a description of one will suffice for both. These jaws surmount the main jaws 6 and 7 in front of the clamping faces thereof in the manner most clearly shown in Figs. 2 and 3. Each auxiliary jaw has side flanges 14 serving to hold the same against lateral displacement from the main jaw and has a pair of leaf springs 15 fixed to the upper end on the rear face thereof, as at 16, to clip over the top of the main jaw and serve as yielding holding means permitting easy adjustment of the auxiliary jaw vertically relative to the main jaw. The lower end of the auxiliary jaw is cut out, as shown at 17 (Fig. 4), to straddle the bar 5 when the auxiliary jaw is in its lowermost position substantially as shown in Fig. 1. It will be noted that the free ends of the leaf springs 15 are bent outwardly, as indicated at 18, so as to pass freely over the upper end of the main jaw when the auxiliary jaw is being applied. The leaf springs are provided of such a length that the ends 18 are disposed approximately midway between the upper and lower ends of the jaw. The purpose in this is to have the auxiliary jaw properly secured on the main jaw in every state of adjustment thereof. The rear face of the auxiliary jaw is so conformed that the auxiliary jaw is capable of rocking in any direction on the front or clamping face of the main jaw. It will be noted in Figs. 2 and 3 that the auxiliary jaw is of greatest thickness substantially at the center thereof so as to have a "high point" at 19 from which point all portions of the rear face are inclined. In other words, the rear face of the auxiliary jaw is convex or arcuate in all directions. The high point 19 is therefore, approximately in line with the free ends 18 of the leaf springs 15. The auxiliary jaws are thus perfectly free to rock vertically with respect to the main jaws and such movement thereof will not result in a deflection of the leaf springs 15. Lateral or sidewise rocking of the auxiliary jaws will, however, necessitate some deflection of the leaf springs. In other words, the auxiliary jaws are universally tiltable relative to the main jaws.

In operation the auxiliary jaws are both adjusted vertically in relation to the bar 5 depending on the height of the work to be handled. The adjustment is made preferably with a view to having the high point 19, which is at the center of the auxiliary jaws, approximately midway of the height of the work so that the center line of pressure will be properly situated with respect to the work and substantially uniform distribution of the clamping pressure will result. The capacity of the auxiliary jaws to rock on the main jaws permits them to assume positions inclined in any direction as required by the particular shape of the work being handled. The tilting of the auxiliary jaws coupled with the fact that the center line of pressure is substantially midway of the height of the work due to the adjustment of the auxiliary jaws greatly improves the character of the work produced. It is also believed apparent from the foregoing description that the auxiliary jaws are readily attachable and detachable as well as adjustable due to the provision of the simple type of frictional holding means.

It is believed that the foregoing description conveys a clear understanding of the invention and of its purposes and advantages so that anyone skilled in the art to which the invention relates will readily appreciate the possible uses and applications thereof.

I claim:

1. In a clamp having a clamping jaw presenting a flat face for engagement with the work to be clamped, an auxiliary clamping jaw removably mounted on the main jaw in front of the clamping face thereof and adjustable in a plane parallel therewith endwise of the main jaw, said auxiliary jaw having lateral rearwardly directed flanges extending endwise of the sides thereof to be disposed along the sides of the main jaw to guide the auxiliary jaw in its adjustment, and spring means mounted on said auxiliary jaw and engaging the back of the main jaw to hold the auxiliary yieldingly in any position of adjustment.

2. In a clamp as set forth in claim 1 the provision on said auxiliary jaw of a convex rear face between the lateral flanges to provide a rocker surface permitting the auxiliary jaw to be inclined in any direction relative to the clamping face of the main jaw, the said lateral flanges serving to hold the auxiliary jaw in place in any position thereof and the spring means being arranged to yield to permit the turning thereof.

3. In a clamp as set forth in claim 1 the provision on said auxiliary jaw of a convex rear face between the lateral flanges to provide a rocker surface permitting the auxiliary jaw to be inclined in any direction relative to the clamping face of the main jaw, the said lateral flanges serving to hold the auxilary jaw in place in any position thereof, the high point of the convex rear face being approximately centrally located, and the said spring means being arranged to engage the main jaw at a point in line with the said high point of the convex rear face substantially as and for the purpose described.

4. In a claim having a clamping jaw presenting a flat face for engagement with the work to be clamped, an auxiliary clamping jaw removably mounted on the main jaw in front of the clamping face thereof and adjustable in a plane parallel therewith endwise of the main jaw, said auxiliary jaw having flanges extending endwise of the sides thereof on the rear face arranged to extend along the sides of the main jaw to guide the auxiliary jaw in its adjustment, and a pair of leaf springs mounted on said auxiliary jaw and extending endwise of the rear face thereof alongside said flanges to clip over the top of the main jaw to hold the auxiliary jaw yieldingly in any position of adjustment.

5. In a clamp as set forth in claim 4, the provision on said auxiliary jaw of a convex rear face between the side flanges arranged to provide a rocker surface whereby the auxiliary jaw may be inclined in any direction relative to the clamping face of the main jaw, the said side flanges serving to hold the auxiliary jaw in place in any position thereof, and said leaf springs being arranged to yield to permit the tilting thereof.

6. In a clamp as set forth in claim 4, the provision on said auxiliary jaw of a convex rear face between the side flanges arranged to provide a rocker surface whereby the auxiliary jaw may be inclined in any direction relative to the clamping face of the main jaw, the said leaf springs being secured at one end of the auxiliary jaw and extending approximately to the middle thereof in line with the high point of the convex rear face substantially as and for the purpose described.

In witness of the foregoing I affix my signature.

EDWIN J. BILLSTROM.

CERTIFICATE OF CORRECTION.

Patent No. 1,669,443.  Granted May 15, 1928, to

EDWIN J. BILLSTROM.

It is hereby certified that error appears in the printed specification of the above numbered patent requiring correction as follows: Page 2, line 116, claim 4, for the word "claim" read "clamp"; and that the said Letters Patent should be read with this correction therein that the same may conform to the record of the case in the Patent Office.

Signed and sealed this 19th day of June, A. D. 1928.

(Seal)

M. J. Moore,
Acting Commissioner of Patents.